United States Patent
Vergara Martinez et al.

(10) Patent No.: US 12,510,134 B2
(45) Date of Patent: Dec. 30, 2025

(54) GEARBOX ASSEMBLY WITH AXIALLY ADJUSTABLE BEVEL GEAR

(71) Applicant: DEERE & COMPANY, Moline, IL (US)

(72) Inventors: Daniel Vergara Martinez, Torrejon de Ardoz (ES); Javier Jose Perez Ramirez, Pinto (ES)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/911,599

(22) Filed: Oct. 10, 2024

(65) Prior Publication Data

US 2025/0129835 A1   Apr. 24, 2025

(30) Foreign Application Priority Data

Oct. 24, 2023 (DE) .......................... 102023129237.4

(51) Int. Cl.
  *F16H 1/14*  (2006.01)
(52) U.S. Cl.
  CPC ..................................... *F16H 1/14* (2013.01)
(58) Field of Classification Search
  CPC ...... F16H 1/14; F16H 1/26; F16H 2057/0221; F16H 55/20; F16H 2057/125
  See application file for complete search history.

(56) References Cited

U.S. PATENT DOCUMENTS

| | | | |
|---|---|---|---|
| 1,904,395 A * | 4/1933 | Whitehead | F16C 35/12 384/534 |
| 4,248,487 A | 2/1981 | Asberg | |
| 4,729,252 A | 3/1988 | Wolfgang et al. | |
| 6,293,704 B1 * | 9/2001 | Gradu | F16C 19/386 384/585 |
| 9,074,677 B2 * | 7/2015 | Martin, III | F16C 23/06 |
| 10,701,860 B2 | 7/2020 | Loutz et al. | |
| 2006/0048595 A1 | 3/2006 | Obermeier | |

FOREIGN PATENT DOCUMENTS

| | | |
|---|---|---|
| DE | 10234331 A1 | 2/2004 |
| EP | 3391725 A1 | 10/2018 |
| GB | 1112245 A | 5/1968 |

OTHER PUBLICATIONS

Extended European Search Report and Written Opinion issued in European Patent Application No. 24206645.4 dated Mar. 28, 2025, in 10 pages.

* cited by examiner

*Primary Examiner* — Jake Cook
(74) *Attorney, Agent, or Firm* — Taft Stettinius & Hollister LLP; Stephen F. Rost

(57) ABSTRACT

A gearbox assembly including a gearbox housing in which a first shaft with a first bevel gear and a second shaft with a second bevel gear are rotatably mounted, the first and second shafts enclosing an angle to each other, the first shaft being supported in a quill equipped with an external thread which interacts with an internal thread of the gearbox housing so that an axial adjustment of the first shaft occurs by turning the quill in relation to the gearbox housing, the quill being supported in the radial direction by a surface of the quill axially spaced from the external thread on a complementary surface of the gearbox housing, and the surface of the quill and complementary surface of the gearbox housing being conical and tapering towards the second shaft.

9 Claims, 2 Drawing Sheets

GEARBOX ASSEMBLY WITH AXIALLY ADJUSTABLE BEVEL GEAR

CROSS-REFERENCE TO RELATED APPLICATIONS

This application claims priority to German Patent Application No. 102023129237.4, filed Oct. 24, 2023, which is hereby incorporated by reference.

FIELD OF THE DISCLOSURE

The disclosure relates to a gearbox assembly.

BACKGROUND

Bevel gears transfer torque between shafts which intersect at an angle to each other.

SUMMARY

The disclosure relates to a gearbox assembly having a gearbox housing in which a first shaft with a first bevel gear and a second shaft with a second bevel gear are rotatably mounted, wherein the shafts enclose an angle to each other and the first shaft is mounted in a quill equipped with a thread interacting with a thread connected to the gearbox housing, so that by turning the quill relative to the gearbox housing, an axial adjustment of the first shaft takes place, and the quill is supported by a surface axially spaced from the threads on a complementary surface of the housing in the radial direction.

Bevel gear transmissions are used to transmit torque between two shafts placed at an angle. One possible application is an auger discharge conveyor of a combine harvester, in which a first and a second auger conveyor enclose an angle to each other, cf. EP 3 391 725 A1.

In order to achieve optimum torque transmission with minimal wear and tear on the gearbox, it makes sense to move one of the shafts in its axial longitudinal direction to an optimized position in which the teeth of one bevel gear penetrate sufficiently far into the spaces between the teeth of the other bevel gear, but without significantly touching the ground between the teeth. Due to unavoidable manufacturing tolerances, it is usually necessary to individually tune the gears to achieve this optimized position.

The traditional procedure for positioning the shaft with the aim of adjusting the backlash of the bevel gears is to achieve the best possible position by adding or removing washers that move one of the shafts and thus the bevel gear in the axial direction and to fix it in this position by bolts. This approach requires a large number of different washers and time-consuming, manual work in gearbox production.

In order to avoid these disadvantages, DE 102 34 331 A1, which is regarded as generic, proposes to support the shaft on a quill which is provided with an external thread, which in turn interacts with an internal thread of a flange ring which is connected to the gearbox housing and extends around the opening in the gearbox housing which accommodates the shaft and the quill. In addition, a cylindrical part of the quill, which is axially offset from the thread, is supported precisely at the opening of the gearbox housing. The quill can therefore be rotated in relation to the threaded flange ring and the gearbox housing, so that the shaft is shifted in the axial direction by turning the quill, thus adjusting the axial position of the shaft and the bevel gear. The quill is locked by a screw that is screwed into a radial threaded hole in the flange ring.

As mentioned, the fixation of the quill in DE 102 34 331 A1 is based on the screw, which extends radially through the flange ring. For this purpose, separate parts must be provided in the form of the screw and the threaded hole, and a further operation is also necessary to tighten the screw. In addition, the screw can come loose during operation, e.g., if the gearbox is used in a vibrating environment, which leads to a rotation of the thread of the quill in relation to the threaded ring and to an unwanted axial movement of the shaft.

The object underlying the disclosure is seen in providing an improved transmission assembly compared to the prior art.

According to the disclosure, this problem is solved by the subject matter of one or more of the following embodiments, wherein features are listed in one or more of the following embodiments which further develop the solution in an advantageous manner.

A gearbox assembly is equipped with a gearbox housing in which a first shaft with a first bevel gear and a second shaft with a second bevel gear are rotatably mounted, the shafts enclosing an angle to each other and the first shaft being mounted in a quill equipped with a thread interacting with a thread connected to the gearbox housing, so that by turning the quill relative to the gearbox housing, an axial adjustment of the first shaft takes place, and the quill is supported by a surface axially spaced from the threads on a complementary surface of the housing in the radial direction. The surfaces are conical and taper towards the second wave.

In this way, the gearbox housing and the quill tighten up with each other, which leads to the fixation of the quill and avoids unintentional movement of the quill.

The above and other features will become apparent from the following detailed description and accompanying drawings.

BRIEF DESCRIPTION OF THE DRAWINGS

On the basis of the drawings, an embodiment of the disclosure is explained.

DETAILED DESCRIPTION

The embodiments or implementations disclosed in the above drawings and the following detailed description are not intended to be exhaustive or to limit the present disclosure to these embodiments or implementations.

Figure 1:
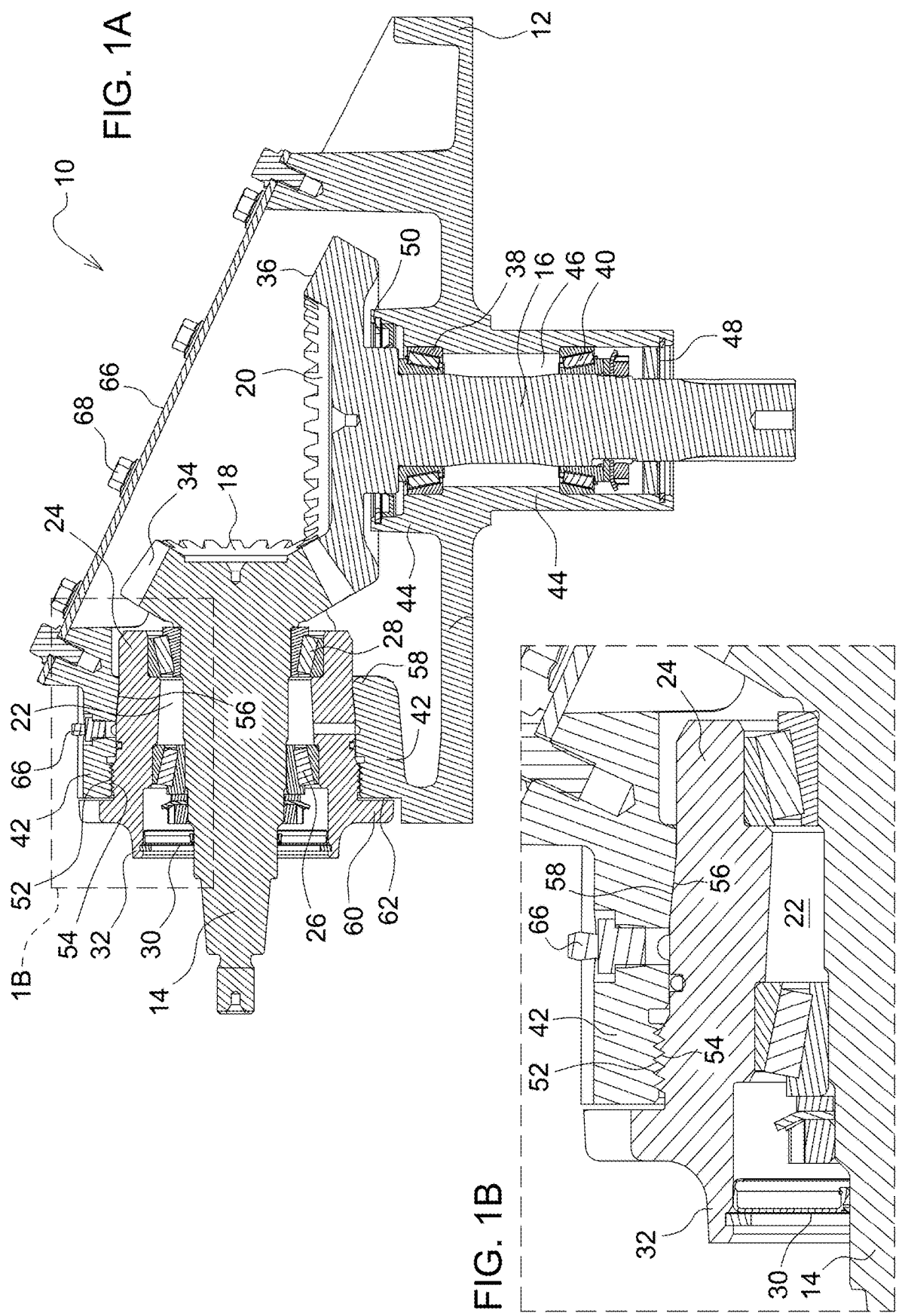
FIG. 1A shows a section through a gearbox assembly.
FIG. 1B shown an enlarged portion of FIG. 1A.
Figure 2:
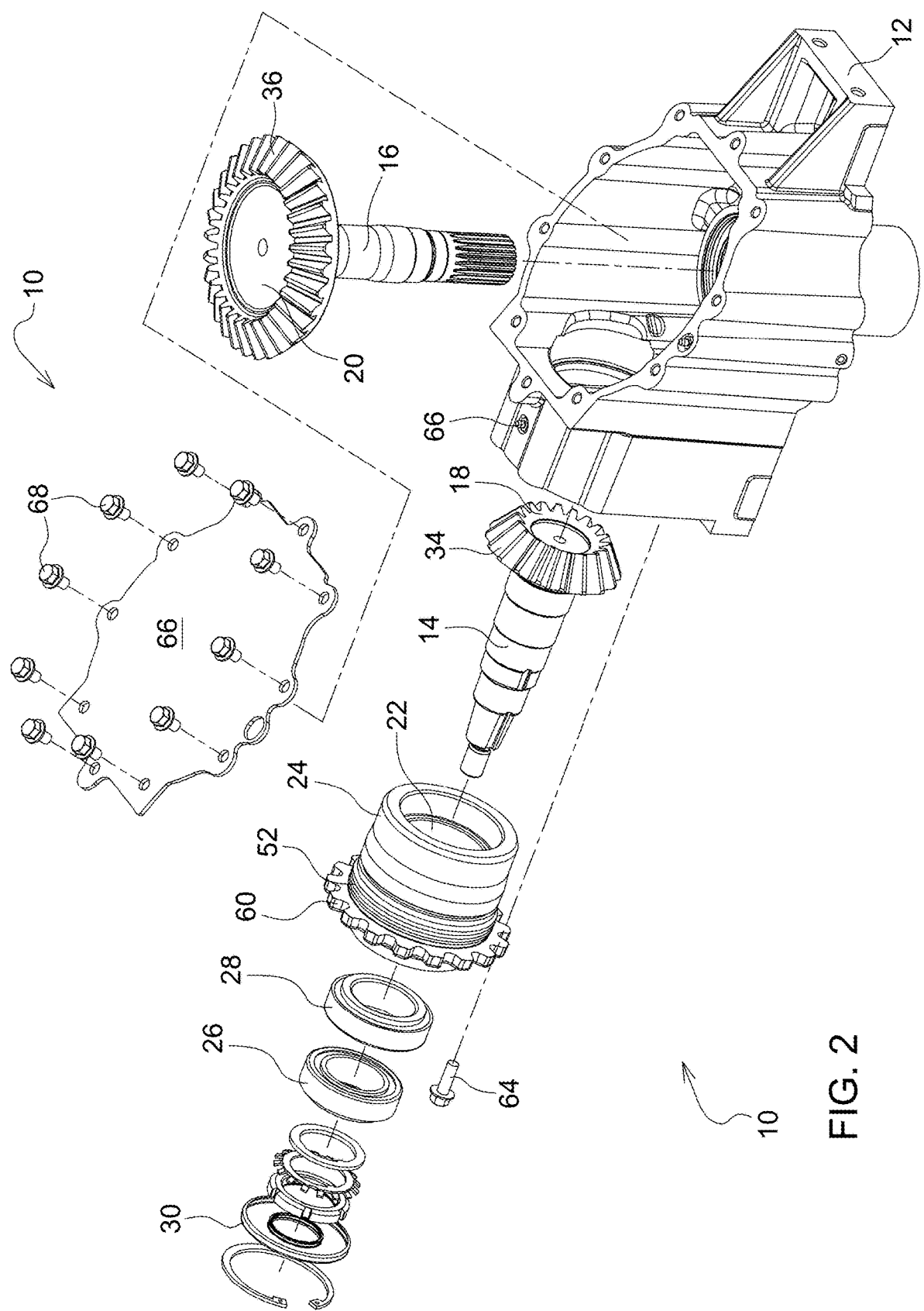
FIG. 2 shows a perspective exploded view of the gearbox assembly.

FIGS. 1A, 1B and 2 show a gearbox assembly 10, which comprises a gearbox 12 in which a first shaft 14 and a second shaft 16 are rotatably supported. At the proximal end of the first shaft 14 arranged within the gearbox housing 12, a first bevel gear 18 is attached or manufactured in one piece with it. At the proximal end of the second shaft 16 arranged within the gearbox housing 12, a second bevel gear 20 is attached or manufactured in one piece with it. The bevel gears 18, 20 each include teeth 34, 36, which comb together to transmit torque from the first shaft 14 to the second shaft 16 or vice versa. The first shaft 14 includes an angle (different from 0°) with the second shaft 16 which is at least approximately 90° in the embodiment shown but could also deviate from it. Gear assembly 10 can be used, for example, in an auger discharge conveyor of a combine to couple two augers together that enclose an angle different from 0°. In the following, the terms axial and radial refer to shafts 14 and 16, and internally and externally to the gearbox housing 12.

The first shaft 14 extends outwards through an opening 22 in a tubular section 42 of the gearbox housing 12 and is rotatable and in the axial direction of the first shaft 14 immovably supported by axially spaced bearings 26, 28 on a quill 24, which in turn encloses the first shaft 14 and is mounted in the opening 22. To the outside, the first shaft 14 is sealed by a gasket assembly 30 extending at the outer end of the quill 24 between the outer circumference of the shaft 14 and an outer annular nozzle 32 of the quill 24.

The second shaft 16 is supported by axially spaced bearings 38, 40 on another tubular section 44 of the gearbox housing 12 and extends outwards through an opening 46 of the gearbox housing 12 provided for in a section 44. At the outer end of section 44, a gasket assembly 48 is provided, extending between the second shaft 16 and section 44. Another gasket assembly 50 is mounted at the inner end of section 44 between the second shaft 16 and section 44. The gearbox housing 12 with the tubular sections 42 and 44 can be manufactured for example as a casting.

The quill 24 is essentially a hollow cylinder, in the interior of which the first shaft 14 extends. The quill 24 is provided at its circumference, in its section adjacent to the outer area of section 42, with an external thread 54, which is engaged with an internal thread 52, which is provided in the outer area of section 42. Furthermore, quill 24 is provided with a conical surface 56 at its circumference, in its area adjacent to the inner area of section 42, the diameter of which narrows inwards in the axial direction (i.e., towards the second shaft 16). For its part, section 42 is equipped with a conical surface 58, which is complementary to the conical surface 56 of quill 24. The conical surfaces 56, 58 are therefore abutting each other. In this respect, reference is made to FIG. 1B.

The section 42 forms an outer, radially extending surface 62, which is adjoined in the axial direction outwards with a certain gap by a ring 60, which is one-piece or permanently connected to the quill 24. The ring 60 is serrated or perforated and can be locked in the circumferential direction of the ring 60 by a bolt 64 (see FIG. 2) extending through a gap in the toothing or a hole in the ring 60 and a corresponding threaded hole in the gear housing 12.

The gearbox housing 12 can be closed by a cover 66, which can be attached to the gearbox housing 12 by means of fasteners 68 (screws). Through an opening 68, the interior of the gearbox housing 12 can be filled with a lubricant such as oil. The opening can be closed by a plug or screw or the like.

In the light of the foregoing, it can be seen that, when the screw 64 is removed, the quill 24 can be rotated in relation to the gearbox 12 by a rotation of the ring 60 or the quill 24 itself, whether by hand or by a suitable tool. Due to the thread 52 of the gearbox housing 12 and the thread 54 of the quill 24, which threads 52, 54 interlock and interact, such a rotation of the quill 24 results in an axial displacement of the quill 24 and thus of the first shaft 14 and the first bevel gear 18 with respect to the second shaft 16 and the second bevel gear 20. In FIGS. 1A, and 1B the first bevel gear 18 moves to the left (outside) or right (inside). At the same time, the conical surface 56 of the quill 24 moves with respect to the conical surface 58 of the gearbox housing 12. The further the quill 24 is moved inwards, towards the second shaft 16, and the closer the first bevel gear 18 is moved to the second bevel gear 20, the stronger the tension between the gearbox housing 12 and the quill 24. This tension leads to elastic deformations of the gearbox housing 12 and, to a certain extent, of the quill 24, which in turn result in a locking of the quill 24 on the gearbox housing 12. As a result, e.g., in the event of vibrations occurring in a harvester during operation of the gearbox assembly 10, unintentional movement of the quill 24 can be avoided. The screw 64 is only used to secure against unintentional rotation of the ring 60 and thus of the quill 24. Since the required adjustment stroke of the quill 24 due to tolerances in the production of the components of the gearbox assembly 10 is usually relatively low and sufficient precision is required for the adjustment, the threads 52, 54 have a rather small pitch (fine thread). In addition, the conicity of the surfaces 56, 58 is sufficiently small to allow a sufficient adjustment stroke of the quill 24 for the usually occurring manufacturing tolerances without excessive deformation exceeding the limits of elasticity of the material used for the gearbox housing 12 or quill 24.

If the quill 24 has been turned into a position in which there is a desired clearance between the bevel gears 18, 20, only the screw 64 is screwed in.

The conical surfaces 56, 58 also serve to center the first shaft 14 and transmit radial and, to a certain extent, axial forces due to the aforementioned elastic deformation of the gearbox housing 12 and quill 24. In the axial direction, the quill 24 and thus the first shaft 14 is also supported by the threads 52, 54 on the gearbox housing 12. Compared to the state of the art, the number of components has been reduced, among other things, by the fact that the thread 52 is arranged on the gearbox housing 12 and not on a separate component.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the drawings, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A gearbox assembly comprising:
a gearbox housing in which a first shaft with a first bevel gear and a second shaft with a second bevel gear are rotatably mounted, the first and second shafts enclosing an angle to each other, the first shaft being supported in a quill equipped with an external thread which interacts with an internal thread of the gearbox housing so that an axial adjustment of the first shaft occurs by turning the quill in relation to the gearbox housing, the quill being supported in the radial direction by a surface of the quill axially spaced from the external thread on a complementary surface of the gearbox housing, and the surface of the quill and complementary surface of the gearbox housing being conical and tapering towards the second shaft;
wherein the second shaft extends at least partially through an opening of the gearbox housing.

2. The gearbox assembly of claim 1, wherein the surface of the quill and the complementary surface of the gearbox housing are positioned closer to the second shaft than the internal and external threads.

3. The gearbox assembly of claim 1, wherein the complementary surface of the gearbox housing and the internal thread of the gearbox housing are arranged on a tubular section of the gearbox housing.

4. A gearbox assembly comprising:
a gearbox housing having an internal thread and a first conical surface axially spaced from the internal thread;
a first shaft rotatably mounted to the gearbox housing, the first shaft having a first bevel gear;
a second shaft rotatably mounted to the gearbox housing at an angle to the first shaft, the second shaft having a second bevel gear meshing with the first bevel gear; and
a quill having an external thread interacting with the internal thread of the gearbox housing and a second conical surface axially spaced from the external thread, the second conical surface being supported on the first conical surface, the first and second conical surfaces tapering towards the second shaft, and a rotation of the quill in relation to the gearbox housing causing an axial adjustment of the first shaft in relation to the second shaft;
wherein the second shaft extends at least partially through an opening of the gearbox housing.

5. The gearbox assembly of claim 4, wherein the first and second conical surfaces are positioned closer to the second shaft than the internal and external threads.

6. The gearbox assembly of claim 4, wherein the internal thread and the first conical surface are arranged on a tubular section of the gearbox housing.

7. The gearbox assembly of claim 1, wherein the gearbox housing is elastically deformed when the first bevel gear is moved closer to the second bevel gear.

8. The gearbox assembly of claim 1, wherein the second bevel gear is coupled to a first end of the second shaft and a second end of the second shaft at least partially extends through the opening of the gearbox housing.

9. A gearbox assembly comprising:
a gearbox housing having an internal thread and a first conical surface axially spaced from the internal thread;
a first shaft rotatably mounted to the gearbox housing, the first shaft having a first bevel gear;
a second shaft rotatably mounted to the gearbox housing at an angle to the first shaft, the second shaft having a second bevel gear at a first end of the second shaft meshing with the first bevel gear; and
a quill having an external thread interacting with the internal thread of the gearbox housing and a second conical surface axially spaced from the external thread, the second conical surface being supported on the first conical surface, the first and second conical surfaces tapering towards the second shaft, and a rotation of the quill in relation to the gearbox housing causing an axial adjustment of the first shaft in relation to the second shaft;
wherein the second bevel gear tapers towards the first end of the second shaft.

* * * * *